BEST AVAILABLE COPY
BEST AVAILABLE COPY
3 Sheets—Sheet 1.
L. B. WOOLFOLK.
REFRIGERATING APPARATUS.
No. 10,500. Reissued July 22, 1884.
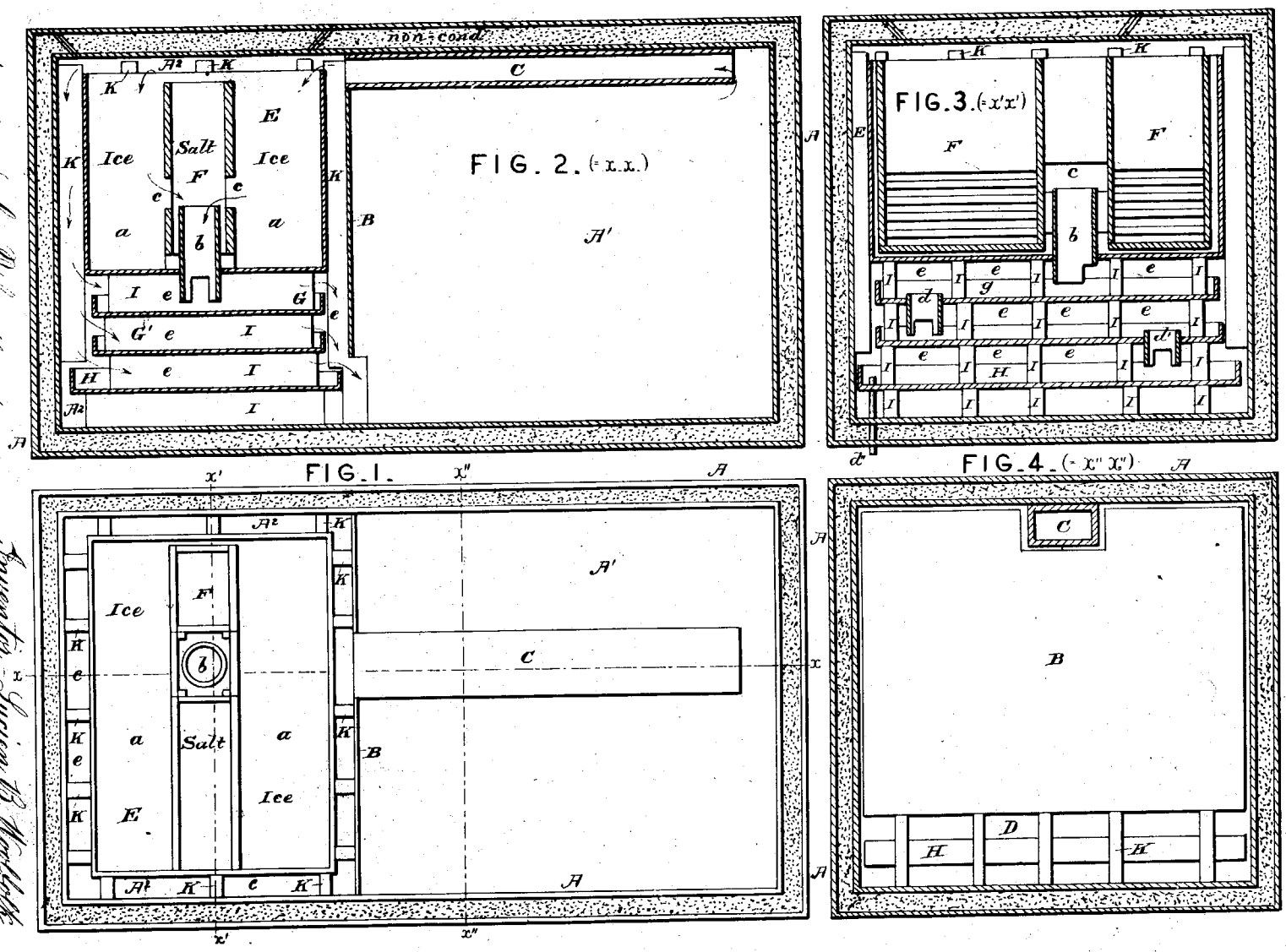
Attest { Geo. P. Smallwood, Walter Allen
Inventor, Lucien B. Woolfolk
By Knight Bros attys.

3 Sheets—Sheet 2.

L. B. WOOLFOLK.

REFRIGERATING APPARATUS.

No. 10,500. Reissued July 22, 1884.

Attest.
Geo. T. Smallwood.
Walter Allen

Inventor.
Lucien B. Woolfolk.
By Knight Bros
Attys.

L. B. WOOLFOLK.

REFRIGERATING APPARATUS.

No. 10,500. Reissued July 22, 1884.

Attest,
Geo. T. Smallwood
Walter Allen

Inventor.
Lucien B. Woolfolk.
By Knight Bros Attys.

UNITED STATES PATENT OFFICE.

LUCIEN B. WOOLFOLK, OF TRACY, MINNESOTA.

REFRIGERATING APPARATUS.

SPECIFICATION forming part of Reissued Letters Patent No. 10,500, dated July 22, 1884.

Original No. 269,771, dated December 26, 1882. Application for reissue filed April 12, 1884.

*To all whom it may concern:*

Be it known that I, LUCIEN B. WOOLFOLK, of Tracy, in the county of Lyon and State of Minnesota, have invented a new and useful Improvement in Refrigerating Apparatus, of which the following is a specification, reference being had to the accompanying drawings.

Figure 6:
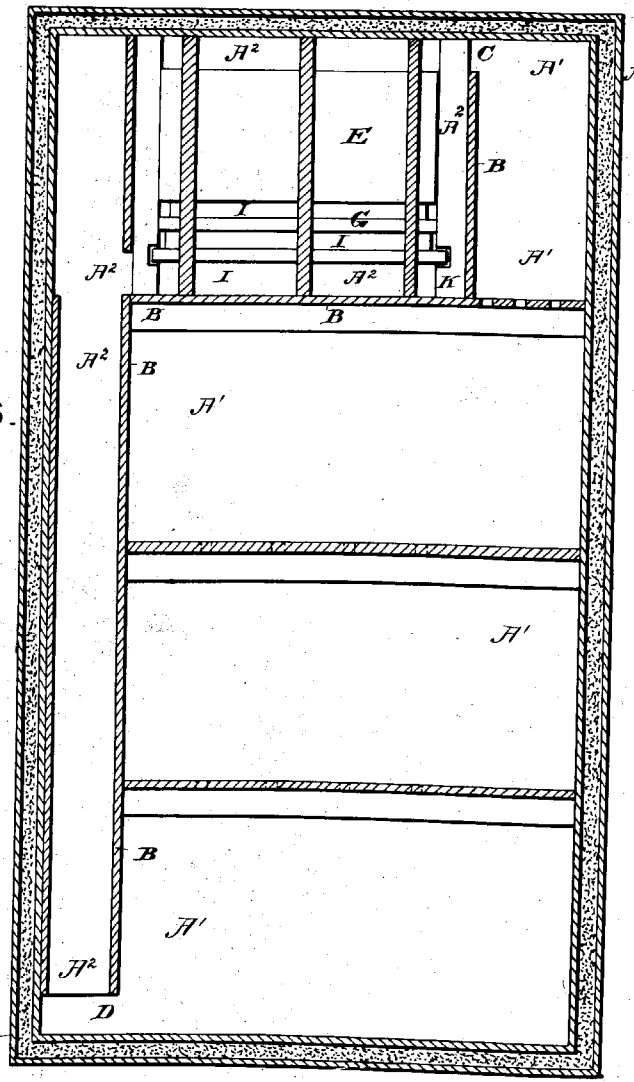
Figure 5:
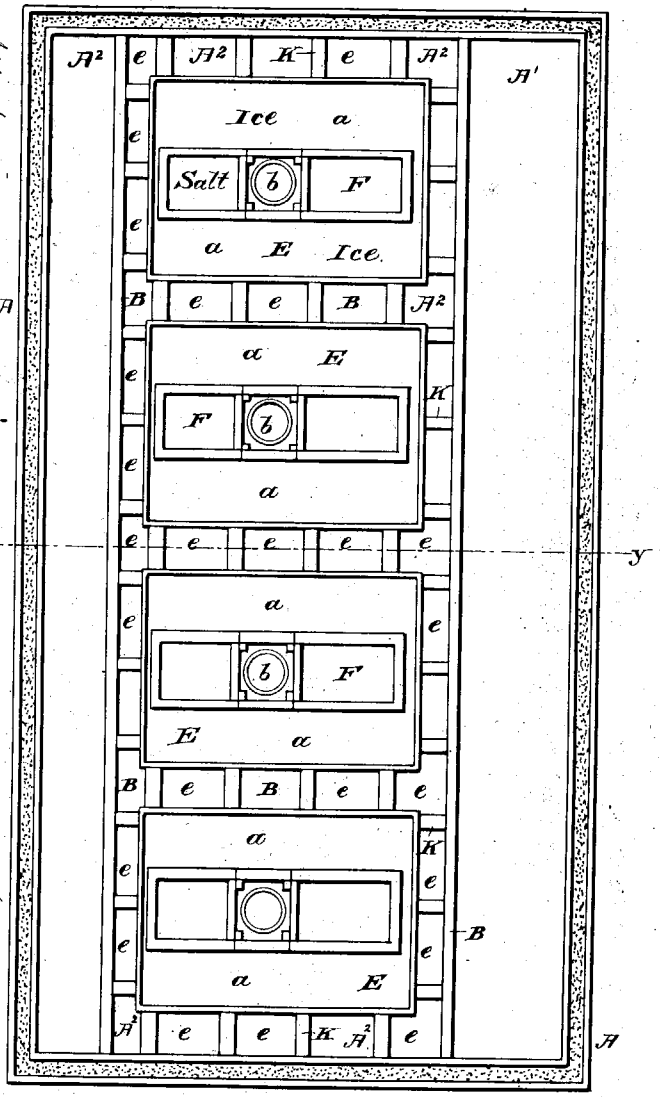
Figure 9:
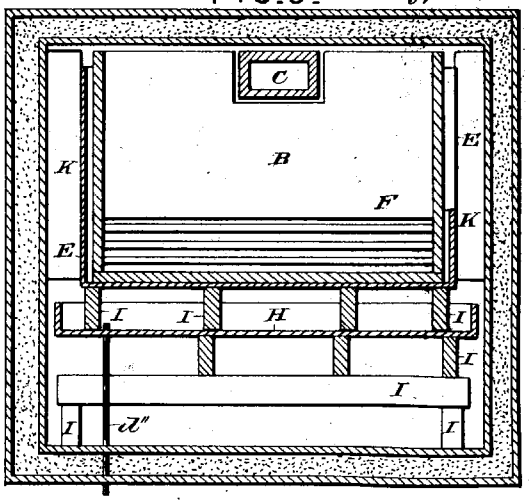
Figure 10:
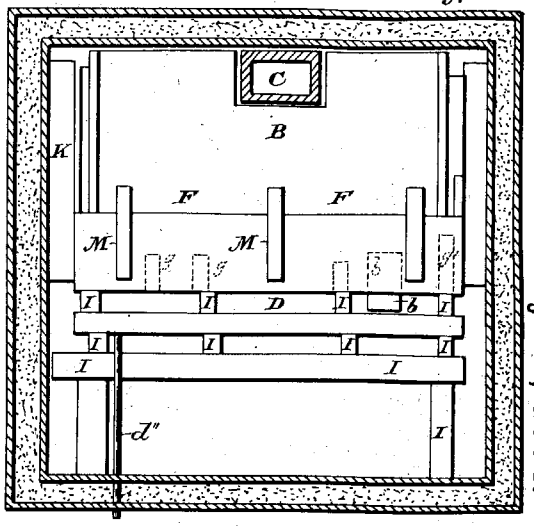
Figure 8:
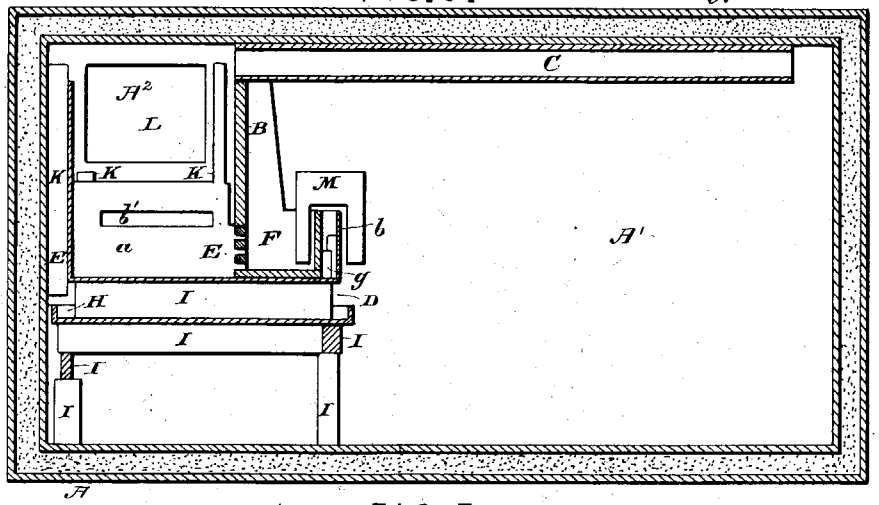
Figure 7:
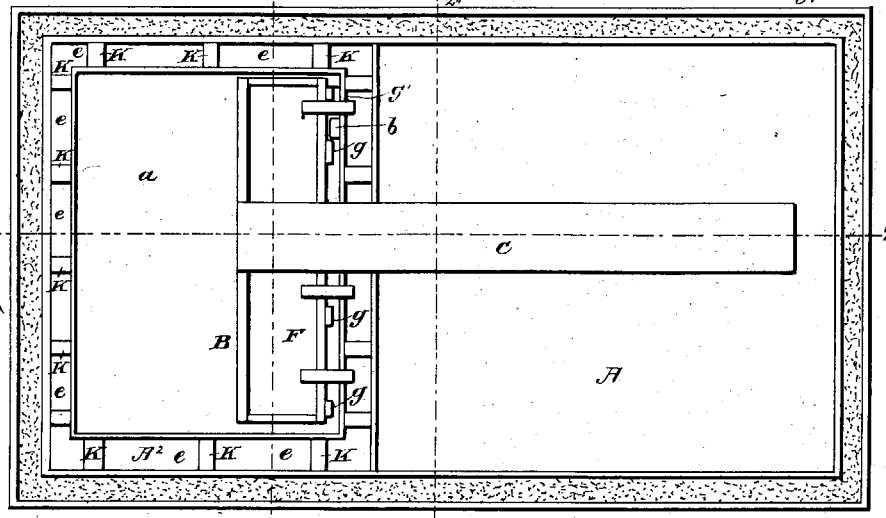

Figures 1, 2, 3, and 4 represent a refrigerator containing my improvement. Fig. 1 is a plan with covers removed. Fig. 2 is a longitudinal vertical section taken through the line $x\ x$ of Fig. 1. Fig. 3 is a vertical cross-section taken through the line $x'\ x'$ of Fig. 1, and Fig. 4 is a vertical cross-section taken through the line $x''\ x''$ of Fig. 1. Figs. 5 and 6 represent a modification of my invention. Fig. 5 is a plan with covers removed. Fig. 6 is a vertical cross-section taken through the line $y\ y$ of Fig. 5. Figs. 7, 8, 9, and 10 represent a modification of my invention. Fig. 7 is a plan with covers removed. Fig. 8 is a longitudinal vertical section taken through the line $z\ z$ of Fig. 7. Fig. 9 is a vertical cross-section taken through the line $z'\ z'$ of Fig. 7. Fig. 10 is a vertical cross-section taken through the line $z''\ z''$ of Fig. 7.

A, Figs. 1, 2, 3, 4, is a refrigerator, having double walls filled with some non-conducting material. The refrigerator A is divided by the partition B into two compartments—the storage-compartment A′ and the refrigerating-compartment $A^2$.

C is the air-inlet through which warm air passes from A′ into $A^2$, and D is an air-escape at the bottom of the partition B, through which cold air passes from $A^2$ into A′.

E is the ice-box, divided preferably by the salt-receptacle F into the two ice-compartments *a*, and preferably supplied with ice through a door in the top of the refrigerator. The salt-receptacle F has both sides slatted at the bottom to allow the brine to come in contact with the salt.

*b* is the overflow or offlet pipe of the ice-box E, enlarged so as to admit of the escape of air, and having an aperture cut in its lower end for the free passage of air. The outlet *b* may be placed anywhere in the ice-box E; but it is preferably so placed that the salt-receptacle will protect it from the ice, while the apertures *c* allow the free passage of brine and air.

G G′ are chill-pans, having enlarged offlet-pipes *d* and *d*′, respectively, for the passage of air and brine.

H is the bottom chill-pan, having offlet-pipe *d*″. The bottom chill-pan rests upon suitable timbers, I, and the upper chill-pans and ice-box rest upon other timbers I, or other proper support extending from front to back in the chill-pans, so as to allow the free passage of currents of air between the ice-box E and the chill-pans over the bottom chill-pan. In Figs. 2 and 3 the bottom chill-pan is shown joined to the walls of the refrigerator, so that it will turn the air forward beneath the ice-box and between the chill-pans. The course of the air-currents is indicated by arrows.

K K are timbers, which support the ice-box on all sides in such a manner as to form air-passages *e e*, through which the air passes in currents downward around and beneath the ice-box and the chill-pans.

The advantages of this apparatus are, first, the action of the salt-receptacle causes an economy of ice, together with greater intensity of cold; second, the air circulates thoroughly throughout the refrigerating-compartment $A^2$, both through the ice in the ice-box and through the air-passages around and beneath the ice-box and the chill-pans; and, third, the air circulates thoroughly throughout the storage-compartment A′ in passing from the air-escape D to the end of the air-inlet C.

The brine passes out of the ice-box E at a very low temperature into the chill-pan G. The bottom of the ice-box is so cold as to be covered with ice or frost. The brine in the chill-pans is also very cold. The air is not only chilled by the metal beneath the pans, but by means of the enlarged offlets *d d*′, the air chilled by the surface of the cold brine is allowed to escape into the air-currents *e*, and thus increase the refrigerating force of the ice-box. Any number of chill-pans may be used, and the circulation of the brine may be increased by returning it from the bottom chill-pan to the ice-box E through a pipe by means of a force-pump.

The air-inlet C is not necessarily a pipe or tube. A tube is employed where it is necessary to induce thorough circulation of the air throughout the storage-compartment A′. In all other cases the tube may be dispensed with, and the air-inlet C consists merely of an opening above the top of the partition B, through which the air may freely pass from A′ into $A^2$. Such an arrangement is represented in Figs. 5 and 6, and it may be adopted wherever most convenient.

In cases where a separate partition, B, is not desired, the front of the ice-box E, together with the supports K, may constitute the partition B.

In Figs. 5 and 6 is a modification of my invention as applied to a large refrigerator, A, where the storage-compartment A′ comprises several stories of a building. Here the refrigerator A is divided, as before, into the storage-compartment A′ and the refrigerating-compartment $A^2$ by the partition B, which extends from bottom to top of the refrigerator A. A series of ice-boxes, E, are placed in the top of the refrigerator A. These ice-boxes E are precisely the same as in Figs. 1, 2, 3, and 4, having each the ice-compartments *a*, salt-receptacle F, chill-pans G and H, enlarged offlets *b*, timbers I and K, and air-passages *e*. The only modification introduced is the modification of the partition B necessary to apply the force of the ice-boxes E to a refrigerator-house of several stories. The partition B separates the ice-boxes E and the refrigerating-compartment $A^2$ from the storage-compartment A′, as in Figs. 1, 2, 3, and 4. The ice-boxes being placed in the top of the refrigerator A, it is necessary to extend the refrigerating-compartment containing the cold air from the ice-boxes A down to the bottom of the refrigerator. The partition B here consists of the wall between the ice-boxes E and the storage-compartment A′ of the floor beneath the ice-boxes E, and of the wall below, which separates $A^2$ from A′. The cold air from the ice-boxes E occupies the entire refrigerating-compartment $A^2$ from the top to the bottom of the refrigerator A, and passes through the air-escape D at the bottom of the refrigerating-compartment $A^2$ into the storage-compartment A′, and thus ascends through the open floors and passes over the top of the partition B into the refrigerating-compartment $A^2$. Here it passes through the ice-boxes E and the air-passages *e e*, and, being chilled, descends through the compartment $A^2$ to the bottom of the refrigerator, as before. It is thus apparent that the only modification here introduced is a modification of the partition B, so as to extend the refrigerating-compartment $A^2$ to the bottom of the refrigerator A.

In Figs. 7, 8, 9, and 10 a modification of my invention is presented, applicable to smaller refrigerators when less refrigerating force is required than in Figs. 1, 2, 3, and 4. We have here the same two compartments, A′ and $A^2$, as in Figs. 1, 2, 3, 4. The cold is induced in the same manner by the action of ice and salt in the ice-compartment *a* and the salt-receptacle F. The air circulates, as before, through the air-inlet C, and then passes through the ice in the box E, and escapes through the enlarged outlet *b b′*, and also passes, as before, through the air-passages *e* around and beneath the ice-box, over a chill-pan, H, and escapes through the air-escape D. In all these modifications of my improvement the circulation of air through the ice in the ice-box is a most important feature, since the ice above the brine is excessively chilled by the conduction of its heat into the brine, so that it greedily seizes upon the heat in the air that passes through it without the ice melting much, the heat absorbed from the air being conducted down into the brine. By this means, and by the air being conducted through the air-passages *e* around and beneath the ice-box over a chill-pan, H, the cold brine becomes the especial refrigerating force, and since one pound of ice melted into brine at 5° to 10° Fahrenheit above zero is equivalent in refrigerating force to several pounds melted at the natural melting-point of ice, the arrangement which makes cold brine the refrigerating agent affects both the efficiency and economy of refrigerating materials. In all these essential features this form of apparatus is the same as in Figs. 1, 2, 3, and 4, the modifications introduced being merely such as secure cheapness of construction and convenience of use as applied to ordinary refrigerators where less refrigerating force is required. The modifications consist, first, in placing the salt-receptacle on one side of the ice-box E, and having one ice-compartment, *a*, and the ice-box is for convenience opened on one side to admit of the supply of ice through the door L in the side of the refrigerator; second, for economy of construction, the partition B is formed by extending one side of the salt-receptacle up to the top of the refrigerator, so that it, with the front of the ice-box and the supports I I, constitutes the partition B; third, in placing the enlarged offlet-pipe *b* behind the salt-receptacle F, which allows the free exit of air from the surface of the brine; but as the passage to the enlarged outlet *b* is too far and intricate to admit of sufficiently free circulation of air through the ice, this circulation is promoted by constructing air-outlets *b′* upon the two sides of the ice-box.

A free course for the brine to the enlarged offlet-pipe *b* is provided by constructing upon the back of the salt-receptacle F (which is a solid board) perpendicular strips *g* of any required thickness, the tops of which are lower than the top of the enlarged offlet-pipe *b*, so that brine and air freely flow over their top; but one of these strips, *g′*, is higher than the enlarged offlet-pipe *b*, and, being clamped tight to the ice-box E by the clamp M, prevents the passage of brine around that end of the salt-receptacle, and in passing round the other end of the salt-receptacle in its longer flow the brine loses much of its chill and flows off from the ice-box with its temperature so much raised that only one chill-pan is necessary to extract its remaining chill. The air-current behind the ice-box and the air-current beneath are one and the same current.

I claim as my invention—

1. In a refrigerating apparatus for cooling the air of a refrigerator, car, or house, the combination, with an ice-box, of a series of chill-pans located beneath the ice-box to receive and retain the liquid that flows from the ice-box until its chill, in great measure, is extracted, the ice-box and the chill-pans beneath being separated from each other, so as to allow the passage of air between them and the ice-box, as set forth.

2. In a refrigerating apparatus, the combination, with the ice-box, of a series of chill-pans beneath the ice-box, the upper chill-pans having enlarged offlets to admit of the ready escape of the air within the chill-pans, and thus allow a flow of air through the chill-pans to be chilled by their inner surface, and to be purified by the absorption of its gases by the liquid in the chill-pans, as set forth.

3. In a refrigerating apparatus, the combination, with the ice-box and the chill-pans beneath the ice-box, of vertical timbers behind the ice-box and upper chill-pans, and horizontal timbers between the ice-box and chill-pans, and between the chill-pans, to form, respectively, vertical air-spaces behind the ice-box and upper chill-pans, and horizontal spaces beneath the ice-box between the ice-box and the chill-pans and between the chill-pans, so communicating that an air-current passes over the ice-box and descends vertically through the air-space behind the ice-box into the horizontal air-spaces between the ice-box and chill-pans and between the chill-pans, as set forth.

4. In a refrigerating apparatus, the combination, with an ice-box, of a series of chill-pans beneath the ice-box, the ice-box and upper chill-pans being separated from the walls to form a space for a descending vertical air-current behind them, and the ice-box and all the chill-pans separated from each other to form horizontal air-spaces between them, communicating with the vertical air-spaces behind them, and the bottom chill-pan joined to the wall in order to turn the vertical descending air-current behind the ice-box and upper chill-pans into and through the horizontal air-spaces between the ice-box and the chill-pans and between the chill-pans, as set forth.

5. The combination of the refrigerator A, storage-compartment A′, refrigerating-compartment $A^2$, partition B, air-inlet C, air-escape D, ice-box E, having ice-compartment *a*, salt-receptacle F, and enlarged offlet-pipe *b*, chill-pans G H, offlet-pipe *d*, timber-supports I and K, and air-passages *e*, substantially as described.

6. The process of cooling the air of a refrigerator by passing the air to be cooled through the ice in an ice-box having ice and salt in separate compartments, with brine as the medium of communication between them, and also through air-passage around and beneath the refrigerating-battery.

7. The salt-receptacle F, in combination with the refrigerator A, ice-box E, having ice-compartment *a*, and enlarged offlet *b*, substantially as set forth.

8. The combination of the ice-box E, salt-receptacle F, ice-compartment *a*, enlarged offlet *b*, timber-supports I and K, and air-passages *e*, with the refrigerator A, partition B, air-inlet C, and air-escape D, substantially as and for the purpose set forth.

9. In combination with the ice-box E, salt-receptacle F, and ice-compartment *a*, the enlarged offlet-pipe *b*, substantially as described.

10. The combination of the chill-pan G with the refrigerator A, ice-box E, salt-receptacle F, ice-compartment *a*, and enlarged offlet *b*, in the manner and for the purpose set forth.

11. The combination of the air-inlet C with the refrigerator A, partition B, storage-compartment A′, refrigerating-compartment $A^2$, ice-box E, salt-receptacle F, and ice-compartment *a*, substantially as described.

LUCIEN B. WOOLFOLK.

Witnesses:
F. A. HUTCHINSON,
L. D. FERREE.